United States Patent

[11] 3,598,204

| [72] | Inventor | John Walter Davis<br>Coventry, England |
|---|---|---|
| [21] | Appl. No. | 770,739 |
| [22] | Filed | Oct. 25, 1968 |
| [45] | Patented | Aug. 10, 1971 |
| [73] | Assignee | The Dunlop Company Limited<br>Birmingham, England |
| [32] | Priority | Oct. 31, 1967 |
| [33] | | Great Britain |
| [31] | | 49342/67 |

[54] VEHICLE ANTISKID BRAKING SYSTEMS
15 Claims, 1 Drawing Fig.
[52] U.S. Cl. .................................................. 188/181 A,
137/48, 137/50, 303/21
[51] Int. Cl. ...................................................... B60t 8/16
[50] Field of Search ........................................... 74/3;
73/510, 511, 512; 188/181, 180; 303/21; 137/48, 50

[56] References Cited
UNITED STATES PATENTS

| 3,432,212 | 3/1969 | Stevens | 188/181 X |
|---|---|---|---|
| 3,456,989 | 7/1969 | Stevens | 188/181 X |
| 574,710 | 1/1897 | Carmichael | 73/510 X |
| 1,923,568 | 8/1933 | Bone | 73/510 X |
| 2,738,968 | 3/1956 | Fleischel | 73/510 X |

Primary Examiner—Milton Buchler
Assistant Examiner—John J. McLaughlin
Attorney—Jeffers and Young ABSTRACT: A skid-sensing means comprising a first governor positively driven by a shaft and arranged to collapse and displace a valve member when its rate of rotation falls below a predetermined value and a second governor frictionally driven by the shaft and arranged to collapse and prevent displacement of the valve member when its rate of rotation falls below a predetermined value, of which the following is a specification.

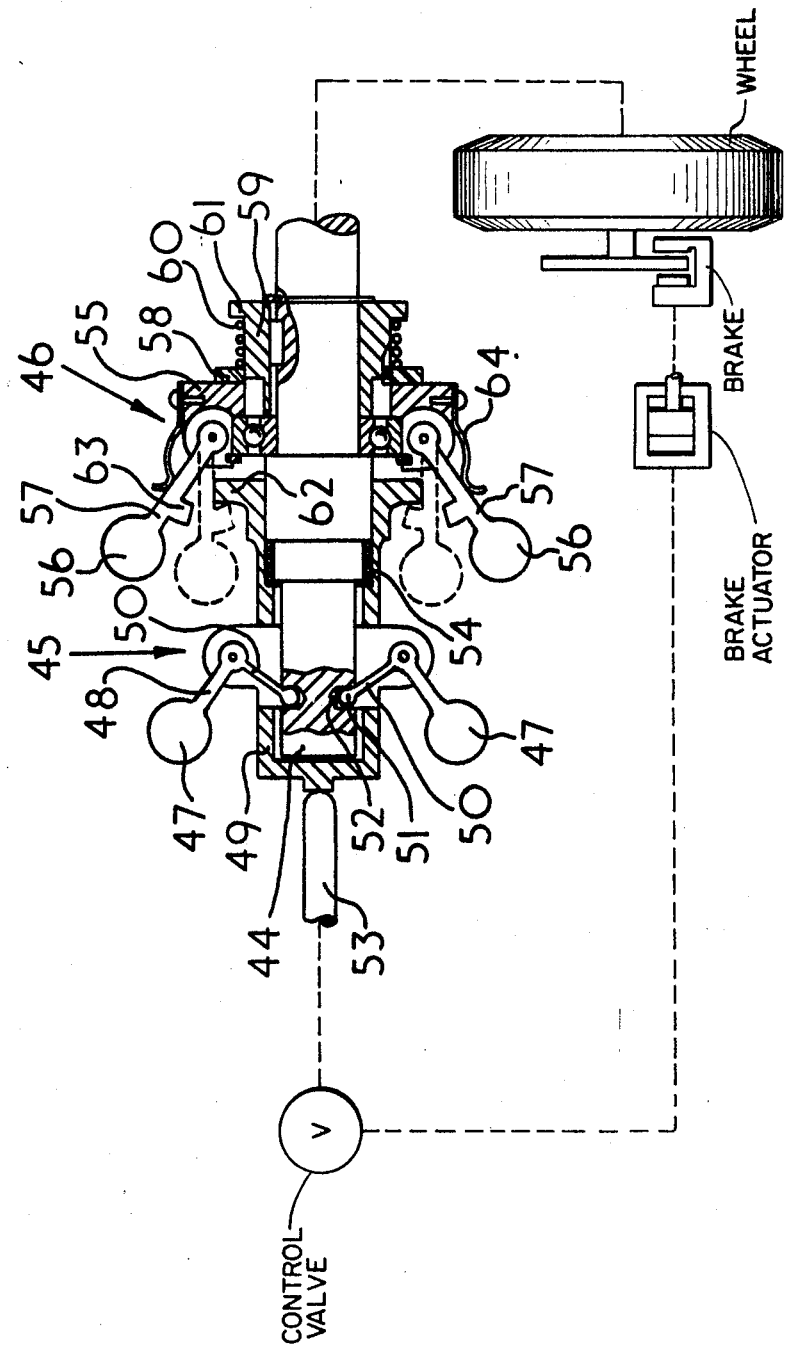

VEHICLE ANTISKID BRAKING SYSTEMS

This invention relates to skid-sensing means and to antiskid control systems incorporating these means particularly for heavy vehicles, for example, commercial freight trucks.

With heavy vehicles it is desirable to arrange for antiskid systems associated with a wheel of the vehicle to be nonoperative on a momentary increase in the deceleration rate of the wheel. This is because the wheel of the vehicle may hop or bounce during braking, and that wheel may then slow, and if the antiskid system releases the brakes due to this, particularly if occuring at the earlier part of a braking operation, the stopping distance may be substantially and undesirably increased.

One object of the invention is to provide an antiskid means for association with a wheel of a vehicle which is effective only when excessive deceleration of the wheel continues until a predetermined low rate of rotation of the wheel is attained.

According to one aspect of the invention a skid-sensing means for a vehicle comprises a first mechanism arranged to displace a control element to initiate skid relief measures when the rate of rotation of an associated wheel of the vehicle is below a predetermined value, and a second mechanism arranged to prevent displacement of the control element when the vehicle speed is below a predetermined value.

According to a second aspect of the invention an antiskid control system comprises a skid-sensing means as described in the preceding paragraph.

One embodiment of the invention will now be described by way of example with reference to the accompanying drawing which is a diagrammatic axial cross-sectional view of a skid-sensing means according to the invention.

An antiskid control system for a vehicle having a fluid pressure-operated braking system incorporates a skid-sensing means associated with a wheel of the vehicle and arranged to initiate skid relief measures by operating a control valve to reduce the brake applying pressure for the brake associated with that wheel. The brake applying pressure may be reduced by applying a counter pressure through the control valve or alternatively by reducing or preventing flow of fluid to the brake and releasing fluid therefrom.

The skid-sensing means comprises a shaft 44 coupled to the wheel of the vehicle by a suitable arrangement of gears (not shown) so that the shaft 44 can be driven to a rate of rotation proportional to the rate of rotation of the wheel. A first governor 45 and a second governor 46 are mounted on and coaxially with the shaft 44. The first governor 45 comprises a set of weights 47 arranged circumferentially around the shaft, each weight being secured to an arm 48 pivotally mounted on a control element 49 in the form of a sleeve slidably mounted on one end portion of the shaft 44. Each arm has a limb 50 projecting therefrom having a ball end 51 engaging a socket 52 formed in the shaft 44 for location of the sleeve 49 relative to the shaft 44.

As the shaft 44 rotates, the arms 49 pivot on the sleeve 49 and the weights 47 move radially away from the shaft 44 under centrifugal force and the arrangement of the limbs 50 causes axial displacement of the sleeve 49 to the right as seen in the drawing. As the rate of rotation of the shaft decreases the weights move radially towards the shaft and at a predetermined minimum rate of rotation collapse on to the shaft causing axial displacement of the sleeve to the left. A push rod 53 is arranged in contact with one end of the sleeve and is arranged to effect operation of the control valve to release the wheel brake when the first governor is slowed to a speed which brings the weight 47 into the collapsed state.

A spring 54 is arranged between the shaft 44 and the sleeve to urge the sleeve towards the left as seen in the drawing. The strength of the spring 54 determines the rate of rotation of the shaft at which the first governor collapses.

The second governor comprises a ring 55 journaled on the shaft and carrying a second set of weights 56 secured to arm 57 pivotally mounted on the ring. The governor ring 55 is frictionally driven by a friction ring 58 mounted on and keyed to a sleeve 59 mounted on the shaft. The friction ring 58 is urged against a face of the governor ring 55 by means of a spring 60 trapped between the friction ring 58 and an annular ridge 61 formed on the sleeve 59.

The end of the sleeve adjacent the second governor has an annular lip 62 formed thereon and each of the arms of the second governor has a latch 63 formed thereon so that when the second governor is in the collapsed state the latches engage the lip as indicated by dashed lines in the drawing to prevent axial displacement of the sleeve on the shaft and rendering the first governor 45 ineffective.

Leaf springs 64 are secured to the ring 55 and are operative independently of the first governor 45 to urge the arms of the governor towards the shaft so that the second governor 46 will collapse at a slightly higher rotational speed corresponding to a vehicle speed of a predetermined value than the rotational speed at which the first governor collapses. Once at the second governor 46 is actuated by the springs 64 so that the is 63 is in engagement with the lip 62, the first governor 45 is rendered ineffective at vehicle speeds which are below the predetermined speed corresponding to the speed at which the second governor will collapse.

In operation, at low vehicle speeds, the second governor 46 remains collapsed and the first governor 45 is therefore latched and inoperative. Hence, the valve is also ineffective and the wheel brake cannot be released by the skid-sensing means and this allows of low speed maneuvering of the vehicle with braking independently of the antiskid operation. The first governor 45 rotates at all times at a speed which is proportional to the rate of rotation of the shaft 44 and hence the rate of rotation of the associated wheel. The second speed-responsive mechanism 46 is frictionally driven independently of the first speed-responsive mechanism 45 is the aforedescribed manner. The speed-responsive member 45 effects operation of the brake through a control valve independently of the second speed-responsive mechanism 46 and obtains a brake release responsive to rate of rotation of 44 at or below a critical speed of 45, as long as the rate of rotation of the second mechanism 46 is greater than a critical speed at which latching takes place between 63 and 62. It should be noted that the critical speed of 46 at which latching occurs, is greater than the critical speed of the first mechanism 45. Upon latching, the first speed-responsive mechanism 45 is nonfunctional, this occurring at vehicle speeds below the predetermined value.

When the vehicle is travelling at speeds at which skidding would be dangerous (above 10 m.p.h. for example), the rate of rotation of the shaft 44 is such that both governors are in flyout position. Should the associated wheel lock the shaft 44 would slow suddenly to rest in the rotational sense and the first governor 45 would collapse to operate the valve and cause brake release. The critical speed of the first governor 45 is the speed at which the governor 45 will collapse to operate the valve and cause brake release. The critical speed of the first governor 45 is the speed at which the governor 45 will collapse to operate the valve and cause brake release. At the same time the sudden slowing of the shaft 44 is not positively transmitted to the second governor 46. The critical speed of the second governor 46 is the speed at which it will collapse to prevent displacement of the valve member. It runs on against the resistance of its frictional coupling to the shaft 44 due to its rotational inertia and slows more gradually. When it collapses the sleeve 49 is axially displaced and the latches 63 cannot engage the lip 62. The sleeve 49 thus remains in a position to operate the valve to release the brake.

If on the other hand the shaft 44 slows to rest at the substantially uniform normal deceleration rate associated with a non-skid stop the second governor 46 slows with the shaft 44 under the influence of its frictional coupling. At a predetermined low speed the second governor 46 collapses and latches the sleeve 49 so stopping the first governor 45 from collapsing at a slightly lower speed. The brake cannot therefore be released by the skid-sensing means in a stop in which skidding does not occur.

The first governor acts as a first mechanism arranged to release the brake when the rate of rotation of the shaft falls below a predetermined value and the second governor acts as a second mechanism arranged to prevent release of the brake when the vehicle speed falls below a predetermined value.

Although the two mechanisms are mechanical devices other suitable devices may be used for example electronic or electrical devices arranged to produce an electrical output having a value dependent upon the rate of rotation of the shaft.

Having now described my invention - What I claim:

1. A skid-sensing means for a vehicle comprising a first mechanism arranged to displace a control element to initiate skid relief measures when the rate of rotation of an associated wheel of the vehicle is below a predetermined value, a second mechanism arranged to prevent displacement of the control element when the vehicle speed is below a predetermined value, and means for operating said second mechanism independently of said first mechanism to render the first mechanism ineffective at vehicle speeds below said predetermined value.

2. A skid-sensing means according to claim 1 wherein the first mechanism comprises a set of weights arranged circumferentially around a shaft to provide a first governor, the shaft being driven to a rate of rotation proportional to the rate of rotation of an associated wheel and the weights being arranged so that they move radially away from the shaft under centrifugal force when the shaft rotates and collapse onto the shaft when the rate of rotation of the shaft falls below a certain minimum value, the governor being arranged to displace the control element when the governor collapses.

3. A skid-sensing means according to claim 2 wherein the said control element comprises a sleeve slidably mounted on the shaft.

4. A skid-sensing means according to claim 3 wherein each of the weights forming the first governor is secured to an arm pivotally secured to the sleeve and each arm has a limb projecting therefrom having a ball end engaging a socket formed in the shaft for location of the sleeve relative to the shaft.

5. A skid-sensing means according to claim 2 wherein the second mechanism comprises a second governor formed from a set of weights mounted on a governor ring arranged on the shaft coaxially with the first governor, the governor ring being frictionally driven by the shaft and the governor being arranged so that in t he collapsed position it prevents displacement of the said control element.

6. A skid-sensing means according to claim 5 wherein a friction ring is mounted on and keyed to the shaft so as to be rotatable with and axially slidable relative to the shaft, the friction ring being spring-urged axially into frictional engagement with the governor ring.

7. A skid-sensing means according to claim 5 wherein the said control element comprises a sleeve slidably mounted on the shaft and the second governor engages the sleeve when in the collapsed position to prevent axial displacement of the sleeve relative to the shaft.

8. A skid-sensing means according to claim 7 wherein each of the weights forming the second governor is secured to an arm pivotally mounted on the governor ring, the end of the sleeve adjacent the second governor has an annular lip formed thereon and each of the arms of the governor has a latch formed thereon so that when the second governor is collapsed the latches engage the lip to prevent axial displacement of the sleeve.

9. A skid-sensing means according to claim 7 wherein the sleeve is spring-urged away from the second governor.

10. A skid-sensing means according to claim 5 wherein the second governor is spring-urged in to the collapsed position.

11. A antiskid control system for a vehicle comprising a skid-sensing means as claimed in claim 1.

12. An antiskid control system for a vehicle having a fluid pressure braking system comprising a skid-sensing means as claimed in claim 1 for association with a wheel of the vehicle arranged to operate a control valve to reduce the brake applying pressure for the brake associated with that wheel.

13. A vehicle skid-sensing means comprising a rotatable member adapted to rotate at a speed which is at all times proportional to the rate of rotation of an associated wheel, a first speed-responsive mechanism adapted to rotate synchronously with said member, a second speed-responsive mechanism operatively connected with said rotatable member and driven thereby independently of said first mechanism, said first mechanism being operatively connected with brake-operating means to effect a brake release responsive to a rate of rotation of said rotatable member at any given moment at or below a critical speed of said first mechanism provided that the rate of rotation of said second mechanism at the said moment is greater than a critical speed of said second mechanism, the critical speed of said second mechanism being greater than the critical speed of said first mechanism and said second mechanism comprising means to render said first mechanism ineffective at vehicle speeds below a predetermined value.

14. A skid-sensing system in accordance with claim 13, including means forming a frictional drive connection between said rotatable member and said second mechanism whereby the rotational inertia of said second mechanism provides for faster differential rotation of the said second mechanism relatively to said rotatable member and thereby said second mechanism will render ineffective said first mechanism only at synchronous speeds of said rotatable member and said second mechanism below a predetermined amount.

15. A system in accordance with claim 13 including bearing means for mounting said second mechanism for rotation independently of said first mechanism and resilient means for biasing said second mechanism to a position which renders said first mechanism ineffective at vehicle speeds below a predetermined amount as said second mechanism and member are rotating synchronously through said friction drive connection.

PO-1050
(5/69)

UNITED STATES PATENT OFFICE
CERTIFICATE OF CORRECTION

Patent No. __3,598,204__    Dated __August 10, 1971__

Inventor(s) __John Walter Davis__

It is certified that error appears in the above-identified patent and that said Letters Patent are hereby corrected as shown below:

Column 1, line 57, "arms 49" should be -- arms 48 --.

Specification, page 3, line 27.

Column 2, line 18, delete "at".

Amendment Under Rule 116, page 1, line 25.

Column 2, line 19, delete "is" and insert -- latch --.

Amendment Under Rule 116, page 1, line 26.

Column 2, line 34, "is" should be -- in --.

Amendment Under Rule 116, page 2, line 9.

Column 2, lines 55-57, delete entire sentence beginning with "The" and ending with "release".

Specification, page 5, line 13.

Column 4, Claim 11, line 1, "A" (first occurrence) should be -- An --.

Signed and sealed this 29th day of February 1972.

(SEAL)
Attest:

EDWARD M. FLETCHER, JR.　　　　　　ROBERT GOTTSCHALK
Attesting Officer　　　　　　　　　　Commissioner of Patents